United States Patent
Viner et al.

(10) Patent No.: US 6,874,499 B2
(45) Date of Patent: Apr. 5, 2005

(54) FILTER ELEMENT THAT HAS A THERMO-FORMED HOUSING AROUND FILTER MATERIAL

(75) Inventors: Andrew S. Viner, Roseville, MN (US); Audra A. Conlan, Tyne & Wear (GB); Brian Cormack, County Durham (GB); Malcolm R. Watson, County Durham (GB); Christopher P. Henderson, County Durham (GB); Desmond T. Curran, County Durham (GB); Elfed I. Williams, Wales (GB)

(73) Assignee: 3M Innovative Properties Company, St. Paul, MN (US)

( * ) Notice: Subject to any disclaimer, the term of this patent is extended or adjusted under 35 U.S.C. 154(b) by 112 days.

(21) Appl. No.: 10/252,623

(22) Filed: Sep. 23, 2002

(65) Prior Publication Data

US 2004/0055604 A1 Mar. 25, 2004

(51) Int. Cl.[7] .................................. A62B 7/10
(52) U.S. Cl. ........................... 128/201.25; 128/205.27; 128/206.17; 55/DIG. 33; 55/DIG. 35
(58) Field of Search ....................... 128/201.25, 205.27, 128/206.17; 55/DIG. 33, DIG. 35

(56) References Cited

U.S. PATENT DOCUMENTS

| | | | | |
|---|---|---|---|---|
| 1,812,380 A | * | 6/1931 | Stelzner ................. | 128/205.27 |
| 2,199,230 A | * | 4/1940 | Schwartz ............... | 128/206.17 |
| 2,922,417 A | | 1/1960 | Bradley et al. | |
| 2,922,418 A | | 1/1960 | Heffernan et al. | |
| 3,183,285 A | | 5/1965 | Boylan | |
| 3,235,633 A | | 2/1966 | Holloway et al. | |
| 3,861,381 A | | 1/1975 | Witman et al. | |
| 3,944,403 A | * | 3/1976 | Simpson et al. ......... | 96/131 |
| 3,971,373 A | | 7/1976 | Braun | |
| 4,046,939 A | | 9/1977 | Hart | |
| 4,231,118 A | * | 11/1980 | Nakagawa ................. | 2/7 |
| RE30,782 E | | 10/1981 | van Turnhout | |
| 4,297,117 A | * | 10/1981 | Holter et al. ............. | 96/153 |
| 4,382,440 A | * | 5/1983 | Kapp et al. ............. | 128/201.25 |
| 4,383,956 A | | 5/1983 | Croft et al. | |
| RE31,285 E | | 6/1983 | van Turnhout et al. | |
| 4,543,112 A | | 9/1985 | Ackley et al. | |
| 4,572,178 A | * | 2/1986 | Takase et al. ........... | 128/205.27 |
| 4,592,350 A | | 6/1986 | Maryyanek et al. | |
| 4,643,182 A | * | 2/1987 | Klein .................... | 128/201.25 |
| 4,790,306 A | | 12/1988 | Braun et al. | |
| 4,951,664 A | * | 8/1990 | Niemeyer ............... | 128/206.24 |
| 5,033,465 A | | 7/1991 | Braun et al. | |
| 5,035,240 A | * | 7/1991 | Braun et al. ........... | 128/205.27 |
| 5,038,775 A | * | 8/1991 | Maruscak et al. ...... | 128/205.27 |
| 5,040,530 A | * | 8/1991 | Bauer et al. ........... | 128/206.12 |
| 5,052,385 A | * | 10/1991 | Sundstrom ............. | 128/205.27 |
| 5,063,926 A | | 11/1991 | Forsgren et al. | |
| 5,078,132 A | | 1/1992 | Braun et al. | |
| 5,140,980 A | * | 8/1992 | Haughey et al. ........ | 128/201.25 |
| 5,195,527 A | * | 3/1993 | Hicks .................... | 128/205.12 |
| 5,222,488 A | | 6/1993 | Forsgren | |
| 5,390,668 A | * | 2/1995 | Lehman ................. | 128/205.27 |
| 5,432,175 A | | 7/1995 | Piwinski et al. | |
| 5,496,507 A | | 3/1996 | Angadjivand et al. | |
| 5,579,761 A | | 12/1996 | Yuschak et al. | |
| 5,592,933 A | * | 1/1997 | Zucchi .................. | 128/201.13 |

(Continued)

FOREIGN PATENT DOCUMENTS

| | | |
|---|---|---|
| DE | 6752895 | 3/1969 |
| DE | 197 00 340 A1 | 7/1998 |
| EP | 0 218 348 A1 | 4/1987 |

*Primary Examiner*—Aaron J. Lewis
(74) *Attorney, Agent, or Firm*—Karl G. Hanson

(57) ABSTRACT

A filter cartridge (5), suitable for attachment to a respiratory mask, has a housing that includes an air inlet (27), an air outlet (39), and filter material (17, 19) through which air to be filtered travels through when passing from the inlet to the outlet. At least part of the housing includes a sheet material (23) that is thermo-formed around the sides of the filter material.

22 Claims, 7 Drawing Sheets

U.S. PATENT DOCUMENTS

| | | | | |
|---|---|---|---|---|
| 5,619,989 A | * | 4/1997 | Kruger | 128/206.17 |
| 5,736,041 A | | 4/1998 | Skov | |
| 5,967,142 A | * | 10/1999 | Dorcheh et al. | 128/206.15 |
| 6,050,262 A | * | 4/2000 | Jay | 128/205.27 |
| 6,119,691 A | | 9/2000 | Angadjivand et al. | |
| 6,161,540 A | * | 12/2000 | Fecteau | 128/205.27 |
| 6,176,239 B1 | * | 1/2001 | Grove et al. | 128/206.24 |
| 6,216,693 B1 | | 4/2001 | Rekow et al. | |
| 6,248,280 B1 | | 6/2001 | Kern et al. | |
| 6,277,178 B1 | | 8/2001 | Holmquist-Brown et al. | |
| 6,375,886 B1 | | 4/2002 | Angadjivand et al. | |
| 6,391,429 B1 | | 5/2002 | Senkus et al. | |
| 6,397,458 B1 | | 6/2002 | Jones et al. | |
| 6,398,847 B1 | | 6/2002 | Jones et al. | |
| 6,406,657 B1 | | 6/2002 | Eitzman et al. | |
| 6,409,806 B1 | | 6/2002 | Jones et al. | |

* cited by examiner

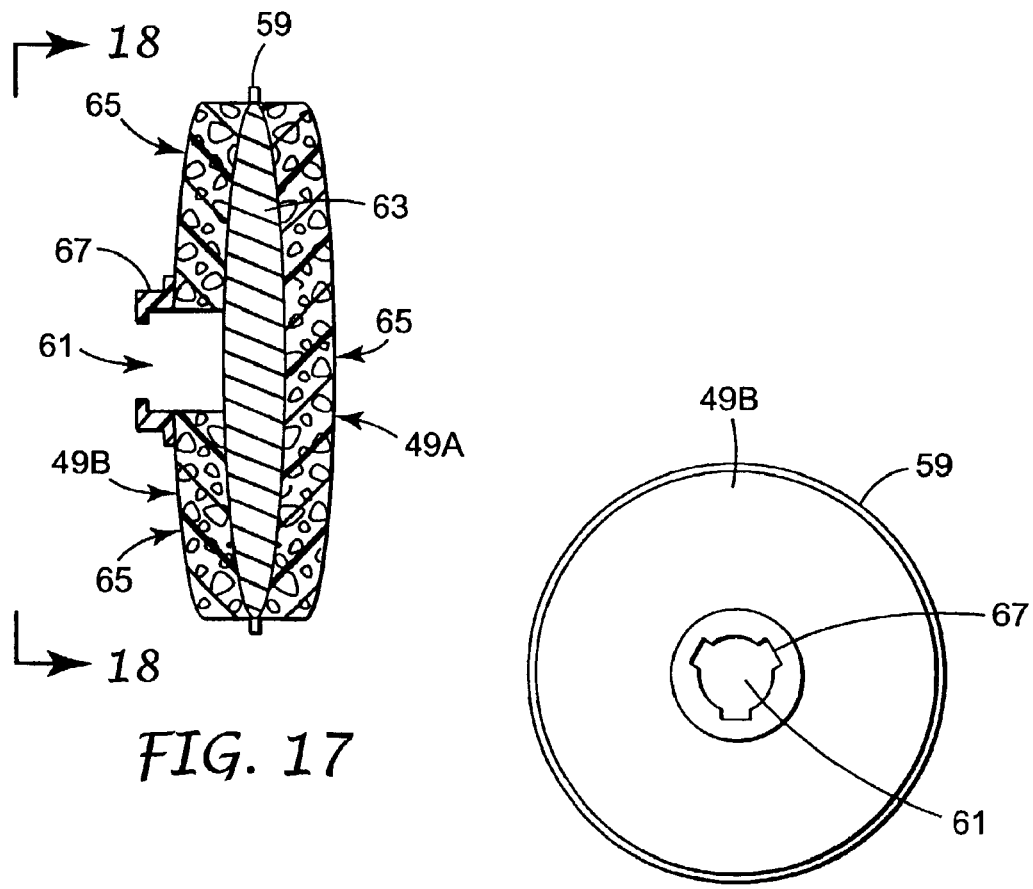
FIG. 17
FIG. 18
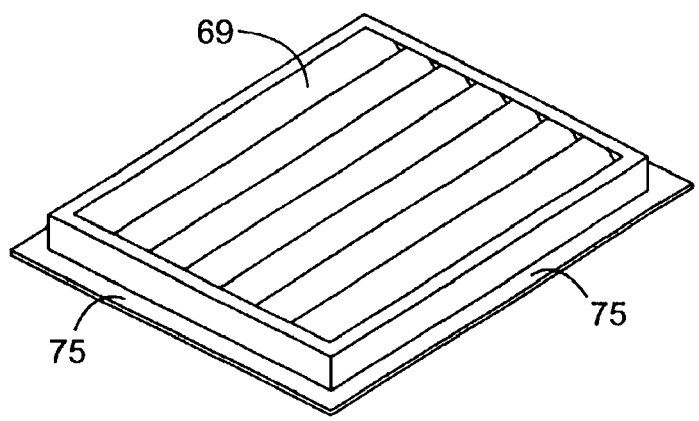
FIG. 19

FILTER ELEMENT THAT HAS A THERMO-FORMED HOUSING AROUND FILTER MATERIAL

The present invention relates to a filter element that is suitable for use, for example, in a respirator, an air filtration unit, and other filtering apparatus.

BACKGROUND

A filter element often needs to be replaceable so that when it reaches the end of its useful life, it can be removed from the filtering apparatus in which it is used and can be replaced by a new filter element. Filter elements are commonly in the form of a cartridge, the housing of which may be provided with some form of attachment mechanism that enables the cartridge to be fitted in, and removed from, the filtering apparatus in which it is used. In other cases—for example, certain types of respiratory masks—the filtering apparatus is intended to be discarded when the filter element reaches the end of its useful life, and, in those cases, the filter element can be an integral part of the filtering apparatus.

Filter cartridges usually are assembled by first forming the housing and then inserting a filtering material into the housing—see, for example, U.S. Pat. Nos. 4,592,350, 5,063,926, 5,736,041, 6,277,178, and 6,248,280; and DE-A-197 00 340. As illustrated in some of these documents, the housing can be formed in two parts that are closed after the filtering material has been placed in position. Respiratory masks that have filter elements as integral parts of the masks have also been described, for example, in U.S. Pat. Nos. 2,922,417, 2,922,418, 3,861,381, and 4,790,306, and in EP-A-0 218 348.

Sorbent particles such as activated carbon are commonly used in respirators as gas or vapor filters. The filters generally are classified according to the manner in which the sorbent material is supported in the filter and include packed bed filters, loaded nonwoven filters, loaded foam filters, and bonded sorbent filters.

In packed bed filters, the sorbent particles are constrained in a container by compressive forces imposed on and transmitted through the particle bed by rigid grids and screens that cover the inlet and outlet areas. Packed bed filters tend to be cylindrical, have constant thickness or bed depth, and have a planar inlet and outlet. To fill the cartridge, the adsorbent particles typically are poured through screens that scatter the particles as they fall, creating a level bed packed substantially to maximum density. The compressive forces from the constraining grids and screens restrain particle movement to minimize flow channeling through the packed bed.

An example of a packed bed filter is shown in U.S. Pat. No. 4,543,112. This patent discloses a sorbent filter assembly made by sequentially placing a first resilient perforated plate, a first retention filter, a sorbent bed, a second retention filter, a second resilient perforated plate, and a cover within the cylindrical portion of a canister shell. The cover is forced downwardly to compress the sorbent bed and to resiliently spring bias or stress the first resilient perforated plate. While the parts are held together under compression, an annular edge portion of the cylindrical shell is rolled into a circumferentially extending groove on the canister cover to hermetically seal and mechanically hold the parts together in their assembled and compressed relationship.

The necessity for this number of parts and processing steps introduces complexity as well as weight, bulk, and cost. A further problem is experienced when a packed bed respirator is combined in series with a particulate filter for use in environments containing particulates as well as vapor hazards such as in paint spray applications. In this situation, the retaining grids and screens may create nonuniform airflow pathways within the particulate filter, resulting in reduced utilization of the filter media and increased pressure drop therethrough.

Loaded nonwoven webs that contain sorbent particles in the interstices between the fibers forming the web have been disclosed in the filtering face mask art. An example is shown in U.S. Pat. No. 3,971,373. Loaded foams also have been disclosed that contain adsorbent particles dispersed within and bonded in the foam structure. U.S. Pat. No. 4,046,939 describes a carbon impregnated foam for protective clothing against noxious chemicals. Both loaded nonwoven webs and loaded foam structures are edge sealed to the respirator component to prevent unfiltered air from bypassing the filter. Known sealing means include adhesives, such as disclosed in U.S. Pat. No. 5,063,926, and gaskets or sealing rings, such as disclosed in U.S. Pat. No. 5,222,488. Loaded structures generally suffer from having a lower sorbent particle density than the packed beds.

A significant advance over the packed beds technology and loaded webs and foams was the invention of bonded sorbents. In bonded sorbent technology, the sorbent particles are molded into a unitary structure using polymer particles that bind the sorbent particles together. Bonded sorbent structures eliminate the need for additional supporting structures, as are necessary in packed beds. An example of a bonded sorbent structure is disclosed in U.S. Pat. No. 5,033,465 (see also U.S. Pat. No. 6,391,429 B1). Bonded sorbent structures have been sealed to the respirator using an adhesive—see, for example, U.S. Pat. No. 5,078,132; or by injection molding—see, for example, U.S. Pat. No. 4,790,306.

SUMMARY OF THE INVENTION

The present invention provides a new filter element that in brief summary suitably comprises or consists essentially of (a) a housing that has at least one inlet and at least one outlet; and (b) a mass of filter material that is contained within the housing such that a fluid to be filtered passes through the at least one inlet, the filter material, and the at least one outlet; wherein at least part of the housing comprises a sheet material that is thermo-formed around at least part of the mass of filter material to prevent passage of fluid between the filter material and the sheet material so that the fluid passes through the filter material before exiting the housing.

The present invention also provides a method of making a filter element, which in brief summary comprises the steps of: (i) providing a mass of filter material; (ii) providing a thermo-formable sheet material; and (iii) thermo-forming the sheet material around at least part of the mass of filter material to encapsulate the filter material and prevent the passage of fluid between the filter and sheet materials, thus preventing the passage of fluid through the filter element other than along a filtering path through the filter material.

Relative to the filter elements and cartridges that have been known in the art, the present invention can allow filter elements, such as filter cartridges for respirators, to be manufactured using relatively few components. Further, such filter elements can be made using relatively few manufacturing steps. A housing, into which a mass of filter material may be contained, can be produced through a thermo-forming step that enables a wall of the housing to contact the filter material to prevent passage of fluid between the filter material and the housing sidewall. The housing, thus, can be easily and inexpensively manufactured while providing a sealing means for ensuring—when the filter element is used in a respirator—that essentially all inhaled air passes through the filter element. The thermo-formed sheet material also may act as a retaining means for securing the mass of filter material to the housing. These features can enable a filter cartridge to be produced for a respirator, which cartridge is relatively light in weight, possesses minimal parts, and is relatively easy to manufacture.

The term "thermo-formed" means that the sheet material has been heated and shaped while still at an elevated temperature. The sheet material may have been shaped, for example, by the application of a vacuum (known as vacuum-forming), by the application of pressure (known as pressure-forming), between shaped molds (known as match-mold-forming), or in any other suitable way.

BRIEF DESCRIPTION OF THE DRAWINGS

By way of example only, embodiments of the invention are described with reference to the accompanying drawings, in which:

FIG. 17 shows a cross-sectional view of a filter cartridge formed from the components illustrated in FIGS. 15 and 16;

FIG. 18 is a view from the attachment side of the cartridge of FIG. 17, taken in the direction of the arrows 18—18;

FIGS. 19 and 20 are, respectively, a perspective view and a cross-sectional view of yet another form of filter element in accordance with the invention.

DETAILED DESCRIPTION OF PREFERRED EMBODIMENTS

Figure 1:
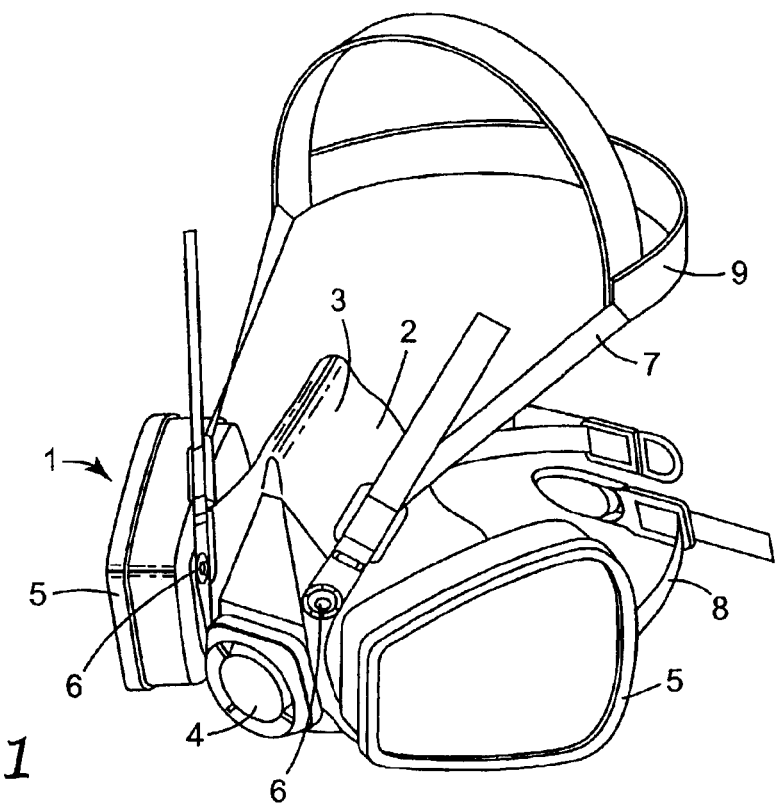
FIG. 1 is a side view of a respiratory half-mask 1 that is provided with filter cartridges 5 in accordance with the invention.
Figure 2:
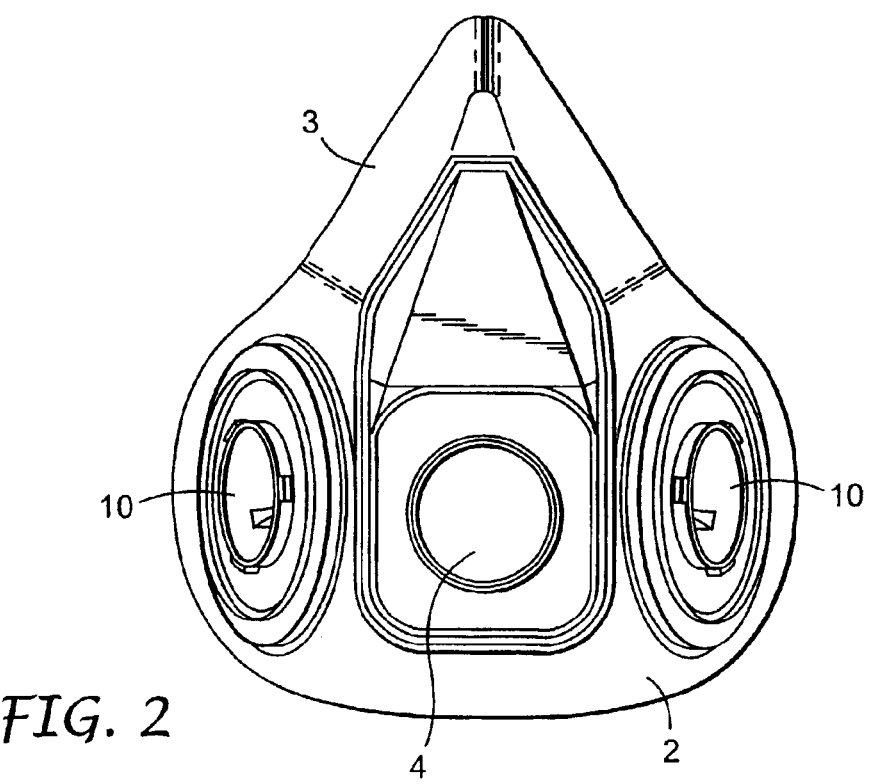
FIG. 2 is a front view of the mask 1 of FIG. 1, showing the filter cartridges 5 and headbands 7, 8 removed from the face piece 2.
Figure 3:
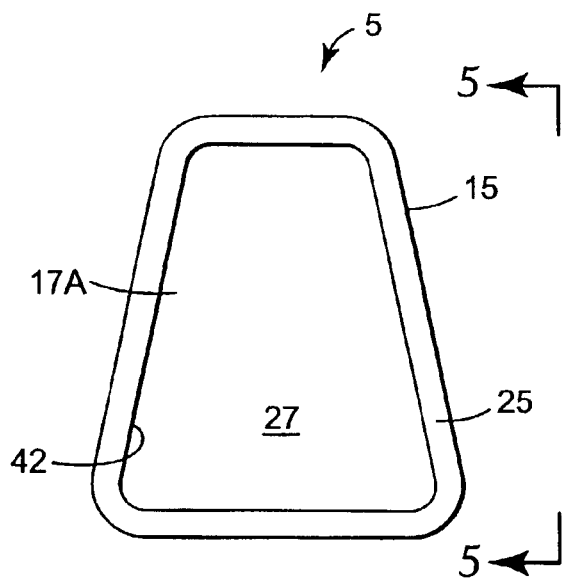
FIG. 3 is a front view of one of the filter cartridges 5 of the mask of FIG. 1.

FIGS. 1 and 2 show one form of a respiratory half-mask that is intended to fit over the nose, mouth, and chin of the wearer. The mask 1 comprises a face-piece 2 that may be produced by being injection molded from a soft, compliant material (for example, a rubber material) and that has an inturned cuff (not visible in the drawings) around its edges. When the mask is worn, the cuff forms a seal against the wearer's skin. The face piece 2 defines an interior gas space that is located between the wearer's face and the face piece 2 when the mask 1 is being worn. The face-piece 2 has a central portion 3, intended to extend over the bridge of the wearer's nose, in which is mounted an exhalation valve 4. On opposing sides of the exhalation valve 4, the face-piece supports inhalation valves (not visible) over which filter cartridges 5 are mounted filter cartridges 5. At the sides of the face-piece are attachments 6 for upper and lower headbands 7, 8 (only those for the upper headband being shown) that form part of a head harness, which harness also includes a cradle 9, fashioned to fit on top of the wearer's head. The filter cartridges 5 may be releasably attached to the mask by bayonet fittings. The bayonet fittings are not visible in FIG. 1, but one part of one fitting is indicated at 10 in FIG. 2.

In use, the headbands 7, 8 are adjusted to fit the head of the wearer and to hold the mask 1 against the wearer's face. When the wearer breathes in, air is drawn into the mask 1 through the filter cartridges 5 and then through the inhalation valves in the cheek portions of the face-piece 2. When the wearer breathes out, air is expelled from the mask through the exhalation valve 4 located in the central portion 3 of mask body 2. The two filter cartridges 5 of the mask 1 are identical and are constructed as described below with reference to FIGS. 3 to 8.

As shown particularly in FIGS. 3 to 6, a cartridge 5 comprises a housing 15 that contains a mass of filter material. The filter material may include a layer of particulate filter material 17 that is disposed adjacent to one major surface of a thicker layer of a vapor-sorbing (may be an adsorbent or absorbent or both) filter material 19. The outer major face of the filter material 17 may be covered with a protective scrim material 17A. The other major face of the sorbing filter material 19 (which too maybe covered by a scrim material 19 to protect it) is located in a tray-shaped base 21 that forms one part of the cartridge housing 15. A sidewall that has sheet material 23, forming the remainder of the cartridge housing 15, is thermo-formed around and preferably encapsulates the sides of the two layers of filter material 17, 19 and the base 21 and a flange margin 25 that is disposed on the outer, scrim-covered major face of the particulate filter material 17. The flange 25 extends radially inward towards the center of the filter cartridge from the housing sidewall. The term "encapsulate" means that the sheet material encloses the mass of filter material enough to accomplish the objectives of producing a filter element that averts break-through of unfiltered fluid through the filter element. The sheet material 23 is adhered to the margin 25 of the outer major face of the particulate filter material 17 and also to the base 21, and thus functions not only to encapsulate part of the mass of filter material 17, 19 but also to hold the filter material 19 in the base 21. The exposed area 27 of the outer major face of the particulate filter material 17—that is, the area inside the margin 25, not covered by the sheet material 23—constitutes an inlet in the housing 15 of the filter cartridge 5 and is covered by a scrim material that serves to protect the filter material. The base 21, described in greater detail below with reference to FIGS. 7 and 8, provides an outlet 39 for the filter cartridge 5 and a plenum chamber 37 between the outlet and the adsorbing filter material 19.

Air enters the filter cartridge through the inlet 27 and passes along a filtering path through both the particulate filtering material 17 and the vapor-sorbing filter material 19 before it enters the chamber 37 from where it can pass through the outlet 39, the associated inhalation valve, and then into the interior gas space defined by the face-piece 2. The close contact between the thermo-formed sheet material 23 of the cartridge housing 15 and the sides of the mass of filter material 17, 19, prevents air, which air is drawn into the filter cartridge 5 through the inlet 27, from by-passing the filter material (referred to as "breakthrough") by leaking around the sides of the latter, and thereby avoiding being filtered as it flows through the cartridge. The term "prevents" as used in this document, thus, means that thermo-formed sheet material substantially precludes breakthrough along the side(s) of the filter material. There may be some air that does indeed pass through the filter material at this location, but the air that does so makes sufficient contact with the filter material so that the amount is not so large that a significant quantity of air goes unfiltered and poses a risk to the safety or health of the wearer. During this inhalation process, the chamber 37 serves to evenly distribute the pressure drop across the whole area of the filter material 19 to avoid premature breakthrough of the inhaled air through the filter material. When the wearer breathes out, the outlet 39 of the filter cartridge 5 is closed by the associated inhalation valve so that exhaled air cannot leave the face-piece 2 through the filter cartridge but is expelled instead through the exhalation valve 4 in the central portion 3 of the mask 1 (see FIG. 1).

In the filter cartridge shown in FIGS. 3 to 6, the air inlet 27 may be defined by the aperture 42 in the sheet material 23, and the air outlet 39 can be located in the pre-formed base tray 21. As a modification, the air inlet 27 could also be formed in a pre-formed housing component, with the thermo-formed sheet material 23 being applied against the sides of the filter material 17, 19. Essentially any form or construction of the inlet, outlet, and housing is contemplated in accordance with the present invention so long as the air can pass through the filter media without encouraging substantial breakthrough to occur.

Figure 4:
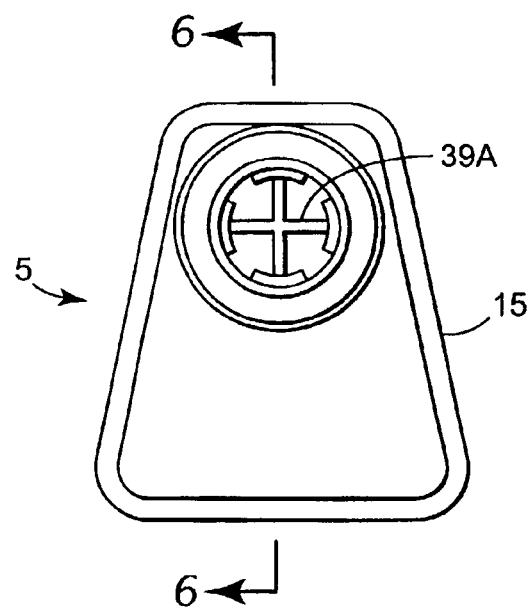
FIG. 4 is a rear view of the filter cartridge 5 of FIG. 3.
Figure 5:
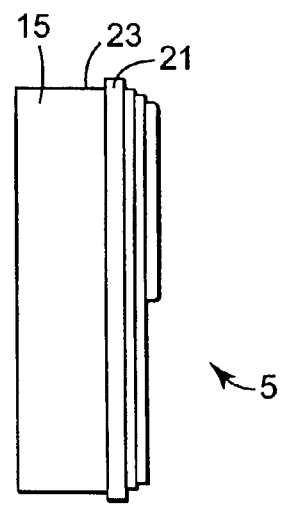
FIG. 5 is a side view of the filter cartridge 5, taken in the direction of the arrows 5—5 of FIG. 3.
Figure 6:
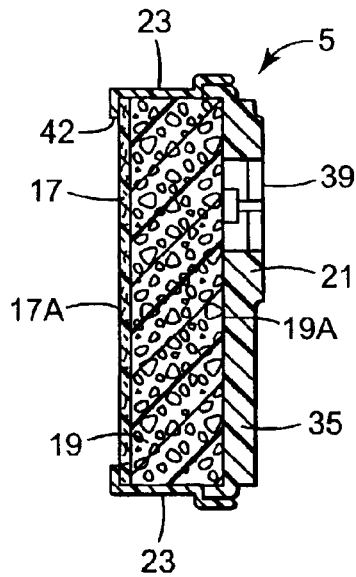
FIG. 6 shows a cross-sectional view of the filter cartridge 5, taken along lines 6—6 of FIG. 4.
Figure 7:
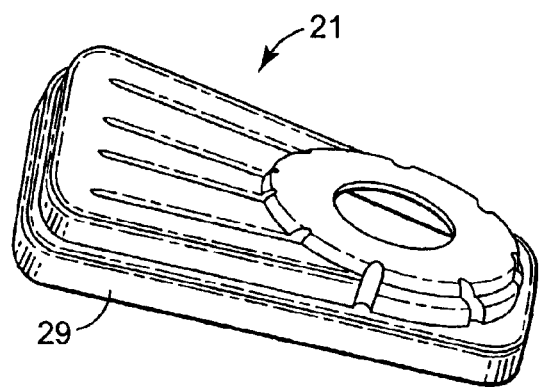
FIG. 7 shows a tray component 21 that forms the base of the filter cartridge 5 of FIG. 3.
Figure 8:
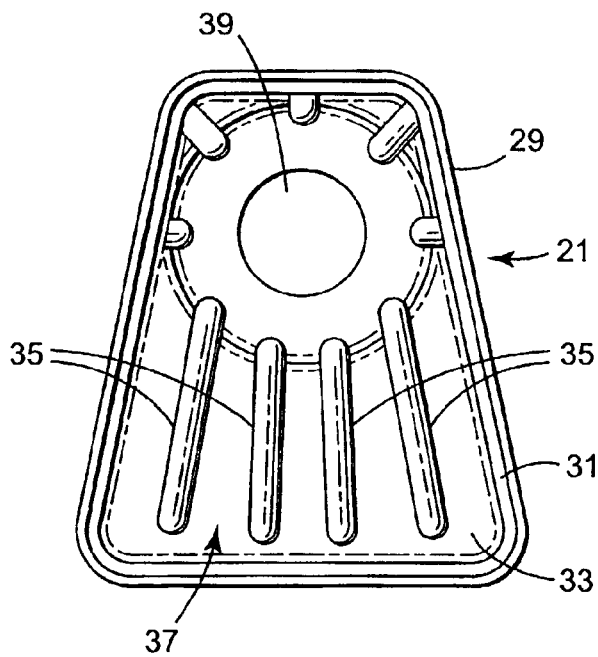
FIG. 8 is a view of the inside of the tray component 21 of FIG. 7.
Figure 9A:
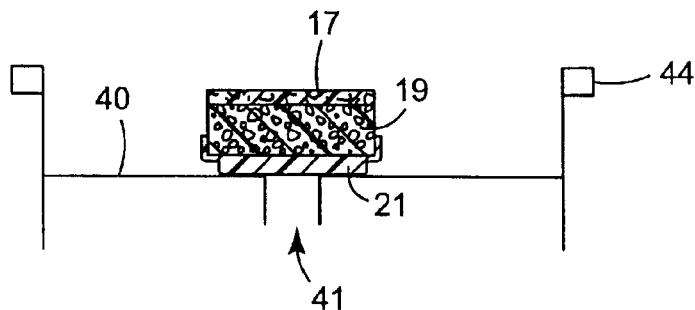
FIGS. 9 to 12 illustrate, diagrammatically, the steps of a method of making a filter cartridge in accordance with the present invention.
Figure 9B:
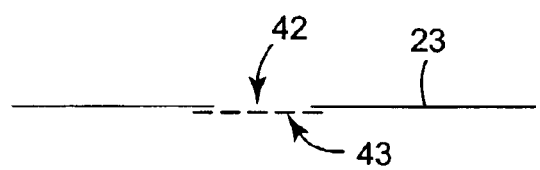
Figure 10:
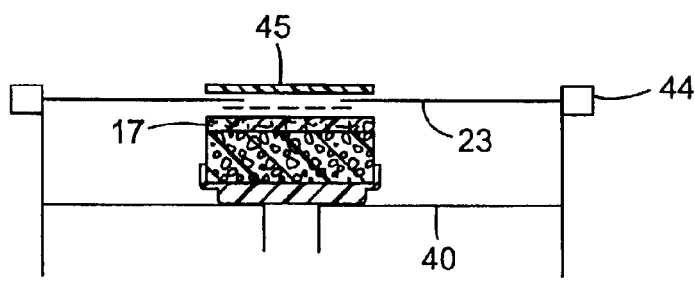

FIGS. 7 and 8 show the housing base 21 separated from the filter cartridge 5. The side walls 29 of the base 21 are stepped or tiered to form an internal ledge 31 that supports the vapor-sorbing filter material 19 in a position in which it is spaced apart from the internal bottom surface 33 of the base. Upstanding ribs 35 on the bottom surface 33 provide additional support for the vapor-sorbing filter material 19 and ensure the presence, within the base 21 of the chamber 37 between the bottom surface 33 and the filter material. An aperture 39 in the bottom of the base 21 constitutes the outlet in the housing 15 of the filter cartridge 5 and is separately provided with one part (not shown) of a bayonet fitting that enables the filter cartridge 5 to be releasably-attached to the face-piece 2 of the respiratory mask 1 (FIGS. 1 and 2). As shown in FIG. 4, cross bars 39A may be provided in the aperture 39—by, for example, a component that is a push fit in the aperture—to furnish support for an inhalation valve in the face-piece 2 when the cartridge 5 is attached to the latter.

The particulate filter material 17 can be of essentially any type known to be suitable for use in respirators for removing particulate material from inhaled air. Preferably, for reasons described below, the filter material is self-supporting. An example of a suitable particulate filter material is available under the trade name "Filtrete" from 3M Company of St. Paul, Minn., USA. The particulate filter material can be made from webs of electrically-charged microfibers such as melt-blown microfibers. See, for example, U.S. Pat. Nos. 6,406,657 B1, 6,375,886 B1, 6,119,691, and 5,496,507. The fibers also can be fibrillated electrically-charged fibers—see U.S. Pat. No. Re. 30,782 and Re. 31,285. Further, the fibers can have fluorine atoms at their surfaces to improve their oily-mist resistance. See, for example, U.S. Pat. Nos. 5,432,175 B1, 6,409,806 B1, 6,398,847 B1, and 6,397,458 B1.

The vapor-sorbing filter material 19 can be of any type known to be suitable for use in respirators for removing noxious vapors from inhaled air. Like the particulate filter material, the vapor-sorbing filter material also preferably is self-supporting. Examples of suitable vapor-sorbing materials are bonded-sorbent materials such as bonded carbon and sorbent-loaded web materials such as carbon-loaded non-woven web materials. Various bonded-sorbent materials, and methods for their preparation, are described in U.S. Pat. Nos. 5,033,465 and 6,391,429 B1. Various sorbent-loaded web materials, and methods for their preparation are described in U.S. Pat. No. 3,971,373.

The base 21 (FIGS. 6–8) of the filter cartridge can be formed from essentially any material known to be suitable for forming a housing of a filter cartridge for a respirator. Most typically the base is formed from a polymeric material by, for example, a thermo-forming (e.g. vacuum-forming) or an injection molding process. A suitable material for the base 21 is a polypropylene film or thin sheet material.

The use of a bayonet connection to attach the filter cartridge 5 to the respirator face piece 2 is not essential, and other forms of attachment could be used with consequent modification, if necessary, to the form of the outlet aperture 39 in the bottom of the base 21. Various arrangements for attaching filter cartridges to respirator face pieces are described in U.S. Pat. No. 5,579,761, to which reference may be made for further information.

The sheet material 23 that forms the remainder of the cartridge housing 15 can be essentially any thermo-formable material that is known to be to be suitable for a housing of a filter cartridge of a respirator. Most typically, the sheet material 23 is a thermo-formable polymeric film or sheet (including multi-layer polymeric film materials), but it could, for example, be a laminate material that includes layers of non-polymeric film materials, for example metallic or woven materials. A suitable thermo-formable material is a polypropylene film. Examples of commercially-available thermo-formable materials include "Simona 1 mm PP-DWST" obtained from Ensinger Ltd of Llantrisant, Wales; and "Borealis 1 mm BEC 5012" and "Borealis 1.5 mm BEC 5012" obtained from Bay Plastics Ltd, of North Shields, England.

FIGS. 9–12 illustrate a method of making the inventive filter cartridge, in which components corresponding to those appearing in FIGS. 3 to 6 carry the same reference numerals. A piece of particulate filter material 17 and a piece of vapor-sorbing filter material 19, both cut to an appropriate shape are placed in the already-formed base tray 21, which is then located on the plate 40 of a vacuum-forming machine, over an opening 41 through which a vacuum will be pulled (FIG. 9A). As shown in FIG. 9B, an aperture 42, slightly smaller than the outer major face of the filter material 17 is cut in the sheet material 23, and a piece of scrim material 43 is placed over the aperture and welded, around the periphery of the aperture to the sheet material. The sheet material 23 is then placed in position in the forming frame 44 (FIG. 10) of the vacuum-forming machine, the platen 40 having first been raised to bring the top surface of the filter material 17 to the level of the sheet to ensure that the sheet 23 is correctly positioned with the aperture 42 over the filter material. A plate 45 is then placed over the aperture 42 in the sheet 23. This plate serves to protect the filter material 17 when the sheet 23 is heated in preparation for the forming process and also serves to seal the aperture 42 when the vacuum is pulled.

Figure 11:
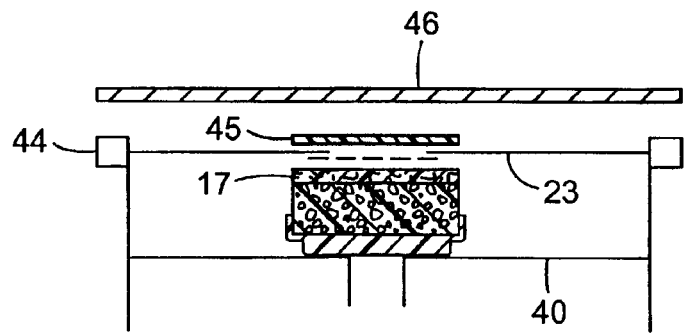
Figure 12:
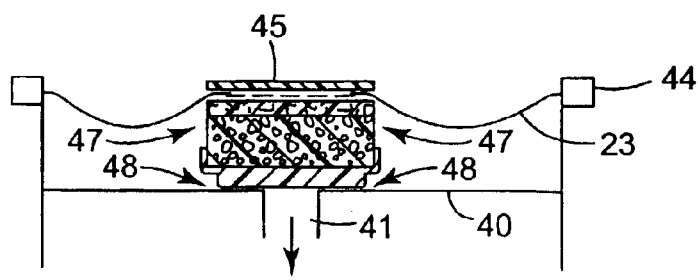

FIG. 11 shows a bank of heaters 46 in the vacuum-forming machine, which are moved into position above the plate 45. The heaters 46 are activated to heat the sheet to a soft, pliable state suitable for vacuum forming. During this phase, as already mentioned, the filter material 17 is protected by the plate 45 against direct exposure to the heaters 46 through the aperture 42. The heaters 46 are then removed, the platen 40 is moved upwards slightly to press the scrim material 43 against the plate 45, and the vacuum pump (not shown) of the machine is switched on to remove air from beneath the sheet 23 through the opening 41 in the platen 40 (FIG. 12). The pressure difference that is created between the upper and lower sides of the softened sheet 23 causes the sheet to move down around the sides of the filter material and base tray assembly 17, 19, 21. More specifically, because the vacuum pump draws air through the sides of the filter materials 17, 19 as indicated by the arrows 47 in FIG. 12, the softened sheet material 23 can preferably move into intimate contact with, the filter materials 17, 19. The softened sheet material 23 desirably adheres to the sides of the base tray 21 (as described above with reference to FIGS. 3 to 6) and, to ensure that that can be achieved, a passage should be provided to allow air to be withdrawn beneath the base tray 21 as indicated by the arrows 48. Such a passage can be provided by, for example, inserting a small spacer (not shown) between the bottom of the base tray 21 and the platen 40.

When the sheet 23 has cooled, the mold platen 40 is lowered away from the plate 45, and excess sheet material is removed from around the base tray 21, yielding a completed filter cartridge 5 that requires only the addition of the cross bars 39A (FIG. 4) and a component by which the cartridge can be attached to a respirator face-piece.

In a filter cartridge 5 (FIGS. 1, 3–6) produced as described above, the step of thermo-forming the sheet 23 around the filter material 17, 19 (FIG. 12) may cause the sheet material to bond to the filter materials (although this is not essential). If desired, an adhesive material or a conformable sealing material can be applied to the sheet material 23 before the thermo-forming step so that it will be positioned between the sheet material and the filter materials when the filter element or cartridge is completed.

Figure 13:
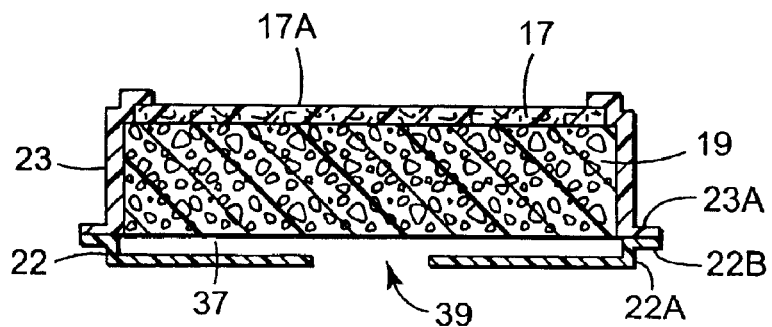
FIGS. 13 and 14 are cross-sectional view similar to FIG. 6 of modified filter cartridges.
Figure 14:
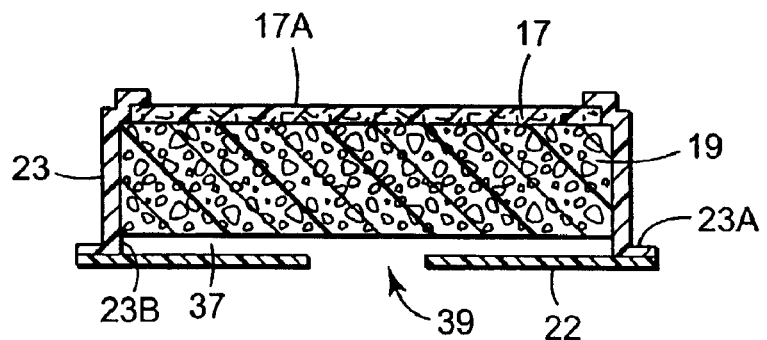

FIGS. 13 and 14 show a modification to the method described with references to FIGS. 9 to 12. In this method, the sheet material 23 may be thermo-formed around the sides of the two layers of filter material 17, 19 and the margin 25 of the outer major face of the particulate filter material 17 without the base tray 21. Following the thermo-forming step, the excess sheet material 23 can be cut away to leave an outwardly extending flange 23a to which a suitably-shaped base 22 can be secured (for example, by ultra-sonic welding) to provide the chamber 37 and the cartridge outlet 39. FIG. 13, in particular, shows a dish-shaped base 22 that has side walls 22A and an outwardly-extending flange 22B that is welded to the flange 23A of the sheet material 23. FIG. 14 shows a modification in which the base 22 comprises a flat sheet that is welded, at its edges, to the flange 23A, the chamber 37 being provided by extending sheet material 23 beyond the filter material 19 during the thermo-forming step as indicated by the reference 23B.

In yet another modification of the method illustrated in FIGS. 9 to 12, the vapor-sorbing filter material 19 and the base tray 21 may be curved rather than planar so that the resulting filter cartridge 5 will be similarly curved.

Figure 15:
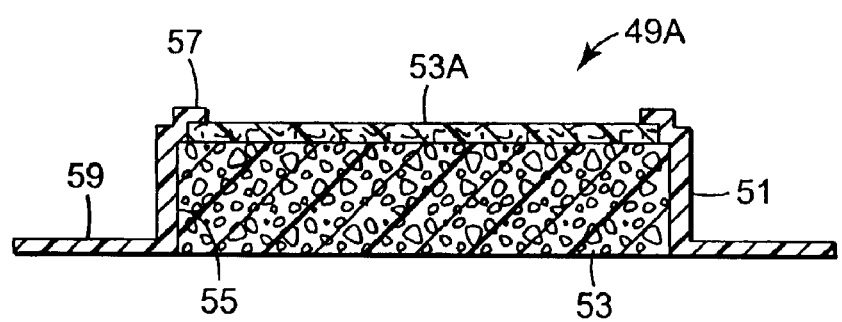
FIGS. 15 and 16 are cross-sectional view of components of another form of a filter element 49A, 49B in accordance with the invention.
Figure 16:
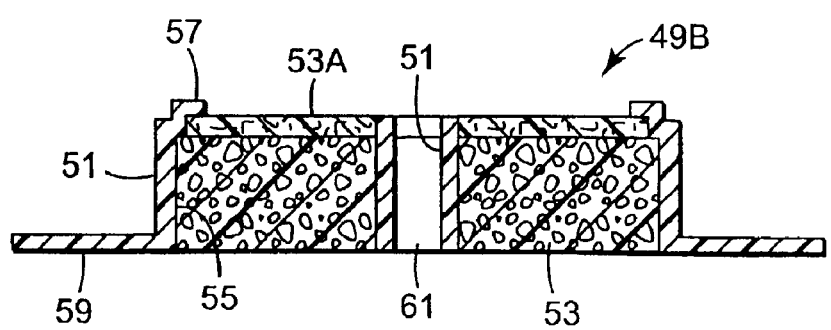

A method as described above with reference to FIGS. 9 to 12 can also be used to make filter cartridges that have a different construction from that illustrated in FIGS. 3 to 6. FIGS. 15 and 16 show, diagrammatically, two circular filter members 49A, 49B that can be made by thermo-forming sheet material 51 around circular pieces of filter material 53 and then used to produce a circular filter cartridge of the type shown in FIGS. 17 and 18 (not to the same scale).

The filter member 49A of FIG. 15 comprises a layer of filter material 53 that has a scrim cover 53A around which a polymeric sheet material 51 has been thermo-formed to engage the sides 55 and a margin 57 of one major face of the filter material and to provide an outwardly-extending flange 59 adjacent the other major face. The filter member 49B of FIG. 16 is similar to that of FIG. 15 except that the layer of filter material 53 is provided with a central aperture 61, the walls of which are also covered with the polymeric sheet material 51 during the thermo-forming step.

As FIG. 17 illustrates the filter members 49A, 49B secured together at the flanges 59, using, for example, a suitable spacing material 63 positioned between them, to provide a filter element that has inlets 65 in the outer major faces of the members 49A, 49B and an outlet at the central aperture 61 of the member 49B. As shown in FIG. 18, an attachment component 67 (e.g. one part of a bayonet fitting) can be attached at the aperture 61 to provide a filter cartridge that can be permanently- or releasably-attached to the face-piece of a respiratory mask.

Figure 20:
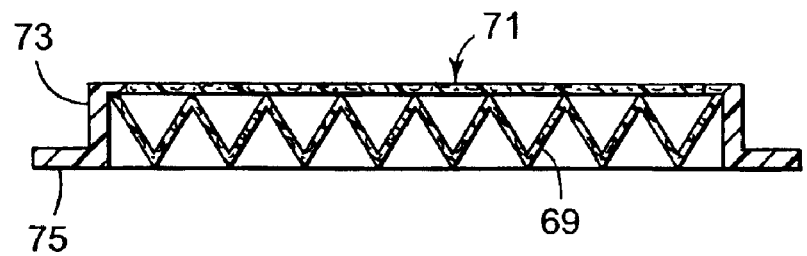

FIGS. 19 and 20 show a filter element suitable for use as a cabin or room air filter, which filter element can also be made by thermo-forming a sheet material around a filter material to provide at least part of the filter element housing. In this case, the filter material is a particulate filter material 69 that is tacked into a pleated configuration and that is then placed over a scrim-covered aperture 71 in a sheet 73 of a thermo-formable material in a vacuum forming machine (similar to FIG. 9). The sheet material is then vacuum formed around the sides of pleated filter material 69 as shown in FIG. 20 and excess sheet material is cut away to leave an outwardly-extending flange 75 adjacent to the base of the filter material.

Figure 21:
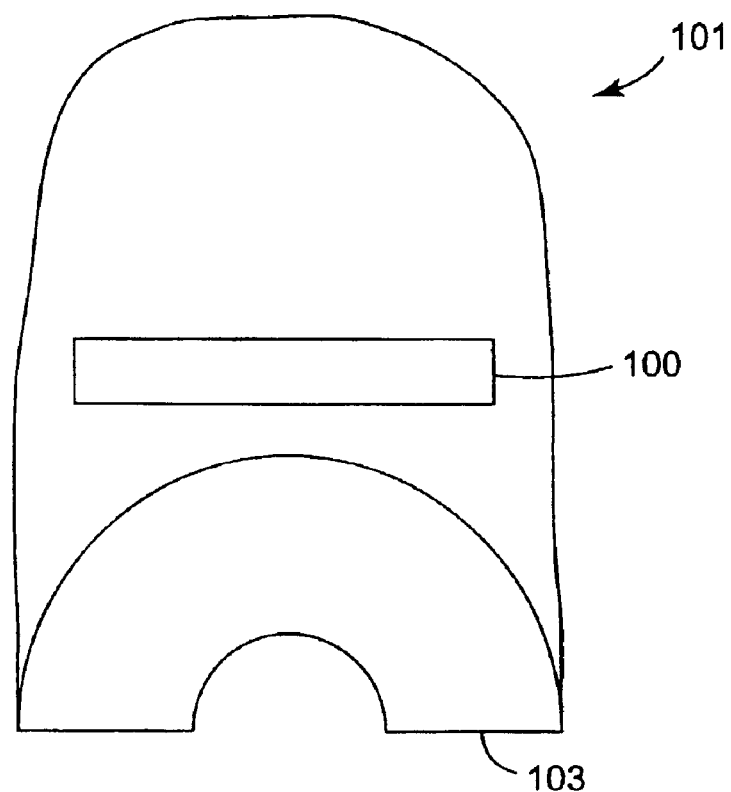
FIG. 21 shows a respiratory hood that incorporates a filter element in accordance with the invention.

FIG. 21 shows a filter element 100 in accordance with the invention, which filter element 100 is incorporated into a respiratory hood 101 that is intended to enclose the head of a wearer. In use, the hood is preferably closed around the neck and shoulders of the wearer by a neck seal 103. The filter element 100 may be similar to that illustrated in FIG. 15 but may have a rectangular, rather than a circular shape. The filter element 100 may be secured over an inhalation valve in an opening in the hood by welding an outwardly-extending flange 59 of the thermo-formable sheet material 51 (see FIG. 15) directly to the hood material. An exhalation valve (not shown) may be provided elsewhere to allow exhaled air to leave the hood. In a similar fashion, filter elements in accordance with the invention may be incorporated into other protective garments.

In a modification to the filter element shown in FIG. 19, the thermo-formable sheet material 51, which is used in the filter element, can also be the material from which the hood itself is formed. In this way, the filter element can become an integral part of the hood.

Although reference has been made above to the use of particulate filter materials and vapor-sorbing filter materials in a filter elements and cartridges in accordance with the invention, it will be understood that other filter materials can be employed, provided that they are in a form that permits a sheet material to be thermo-formed around them. For example, web materials can be loaded with particles that remove a component from a fluid by chemical reaction or amalgamation rather than sorption, with particles that catalyze the conversion of a noxious substance to a harmless form, with particles that deliver an ingredient to, rather than remove an ingredient from, a fluid. Filter elements constructed as described above are not restricted to use as air or gas filters but could also be used for liquid filtration. The filter elements can be either rigid or flexible and, as already indicated, may have a curved form.

The thermo-formable sheet material that is used, in the embodiments of the invention described above, to form at least part of the housing of a filter element can be essentially any thermo-formable material that is capable of contacting the filter material to prevent significant fluid leakage between them and thus prevent significant quantities of unfiltered fluid from reaching the outlet of the filter element. As already described, the thermo-formable material may be an impermeable polymeric film that, during the thermo-forming process, forms some form of a bond, connection, or the like to the adjacent filter material. This may be achieved, for example, through the use of a multi-layer film, the inner layer of which (adjacent the filter material) has a lower melting point than the other layers. Depending on the construction of the filter element, however, the use of an impermeable thermo-formable material, or a thermo-formable material that forms an actual bond to the filter material may not always be necessary to prevent unfiltered fluid reaching the outlet of the filter element. In some cases, it may be sufficient that the thermo-formable material is in close contact with the filter material, or that it compresses the edges of the latter (for example, in the case of the circular filter elements illustrated in FIG. 15).

All of the patents and patent applications cited above are incorporated in total into this document as if reproduced in full.

This invention may be suitably practiced in the absence of any element not specifically described in this document.

What is claimed is:

1. A filter cartridge that comprises:
   (a) a housing that has at least one inlet and at least one outlet; and
   (b) a mass of filter material that is contained within the housing such that a fluid to be filtered passes through the at least one inlet, the filter material, and the at least one outlet;
   wherein the housing comprises a sheet material that has been thermo-formed around at least part of the mass of filter material to form at least a housing sidewall that assists in preventing passage of fluid between the filter material and the sheet material so that fluid passes through the filter material before exiting the housing, and
   wherein the housing includes attachment means for securing the cartridge to a face piece and the housing comprises a tray in which the mass of filter material is located, the tray having upstanding internal ribs on its base that engage and support the mass of filter material and define a space, forming an air chamber, between the base of the tray and the mass of filter material.

2. The filter cartridge of claim 1, wherein the housing sidewall is a fluid impervious polymeric material.

3. The filter cartridge of claim 1, wherein the housing sidewall is bonded to the filter material.

4. The filter cartridge of claim 3, further including a sealing material between the housing sidewall and the filter material.

5. The filter cartridge of claim 1, wherein at least one of the at least one inlet and the at least one outlet of the filter cartridge is defined by the thermoformed housing sidewall sheet material.

6. The filter cartridge of claim 1, wherein the mass of filter material is self-supporting.

7. The filter cartridge of claim 6, wherein the mass of filter material comprises one or more layers, the inlet being positioned adjacent an outer major surface of the mass of filter material and the housing sidewall being thermo-formed around sides of the layer(s).

8. The filter element of claim 7, wherein the thermo-formed sheet material is secured to the outer major surface of the mass or filter material around the inlet.

9. The filter cartridge of claim 1, wherein the mass of filter material includes a vapor-sorbing filter material.

10. The filter cartridge of claim 9, wherein the vapor-sorbing filter material is a bonded-sorbent material or a sorbent-loaded web material.

11. The filter cartridge of claim 9, wherein the mass of filter material also includes a particulate filter material.

12. The filter cartridge of claim 1, wherein the mass of filter material comprises a layer of particulate filter material disposed adjacent to a layer of vapor-sorbing material, wherein air passing along a filtering path between the inlet and the outlet of the filter element passes through both the layer of particulate filter material and the layer of vapor-sorbing material.

13. The filter cartridge of claim 1, wherein the mass of filter material comprises a pleated layer of material.

14. A respiratory mask that comprises a face piece that is shaped to fit over at least the nose and mouth of a person, and at least one filter cartridge of claim 1, through which filtered air can be drawn into the mask.

15. The respiratory mask of claim 14, wherein the filter cartridge is detachably-secured to the face piece.

16. A respiratory mask that comprises a face piece that is shaped to fit over at least the nose and mouth of a person and at least one filter cartridge of claim 1, wherein the filter cartridge includes a bed of carbon that is held in position by the thermo-formed sheet material.

17. A respiratory mask that comprises:
   (a) face piece that is adapted for fitting at least over a person's nose and mouth and that assists in defining an interior gas space when the mask is worn; and
   (b) at least one filter cartridge that is attached to the mask body, the filter cartridge including:
      (i) a housing; and
      (ii) a mass of filter material, wherein the filter cartridge housing has a sidewall that is thermo-formed about the mass of filter material to encapsulate the mass of filter material, and wherein the housing includes a plenum that has at least one spatial conduit so that air that has passed through the filter material can enter the plenum and pass therethrough before leaving the filter cartridge housing through an outlet, the air passing through the housing outlet then enter the interior gas space where the air may then be inhaled by a wearer of the respiratory mask.

18. The respiratory mask of claim 17, wherein the filter cartridge is removably attached to the face piece.

19. The respiratory mask of claim 17, wherein the housing includes a means for attaching the cartridge to the face piece, and wherein the housing sidewall is thermo-formed in direct contact with the mass of filter material.

20. The respiratory mask of claim 19, wherein the housing sidewall is thermo-formed in direct contact with sorptive carbon filter material.

21. The respiratory mask of claim 17, wherein the housing further includes a flange, which flange defines an inlet to the filter cartridge.

22. The respiratory mask of claim 21, wherein the housing further includes a base, the thermo-formed housing sidewall being thermo-formed to the base.

* * * * *

UNITED STATES PATENT AND TRADEMARK OFFICE
CERTIFICATE OF CORRECTION

PATENT NO. : 6,874,499 B2
DATED : April 5, 2005
INVENTOR(S) : Viner, Andrew S.

It is certified that error appears in the above-identified patent and that said Letters Patent is hereby corrected as shown below:

Column 4,
Line 2, delete "edges" and insert -- edge -- therefore.
Line 43, after "flange" insert -- or --.

Column 10,
Line 6, delete "or" and insert -- of -- therefore.
Line 35, after "(a)" insert -- a --.
Line 49, delete "enter" and insert -- enters -- therefore.

Signed and Sealed this

Seventh Day of June, 2005

JON W. DUDAS
*Director of the United States Patent and Trademark Office*